Jan. 8, 1929.
G. T. REICH
1,698,171
APPARATUS FOR TREATMENT OF WASTE ORGANIC MIXTURES AND THE LIKE
Filed April 1, 1924     2 Sheets-Sheet 1
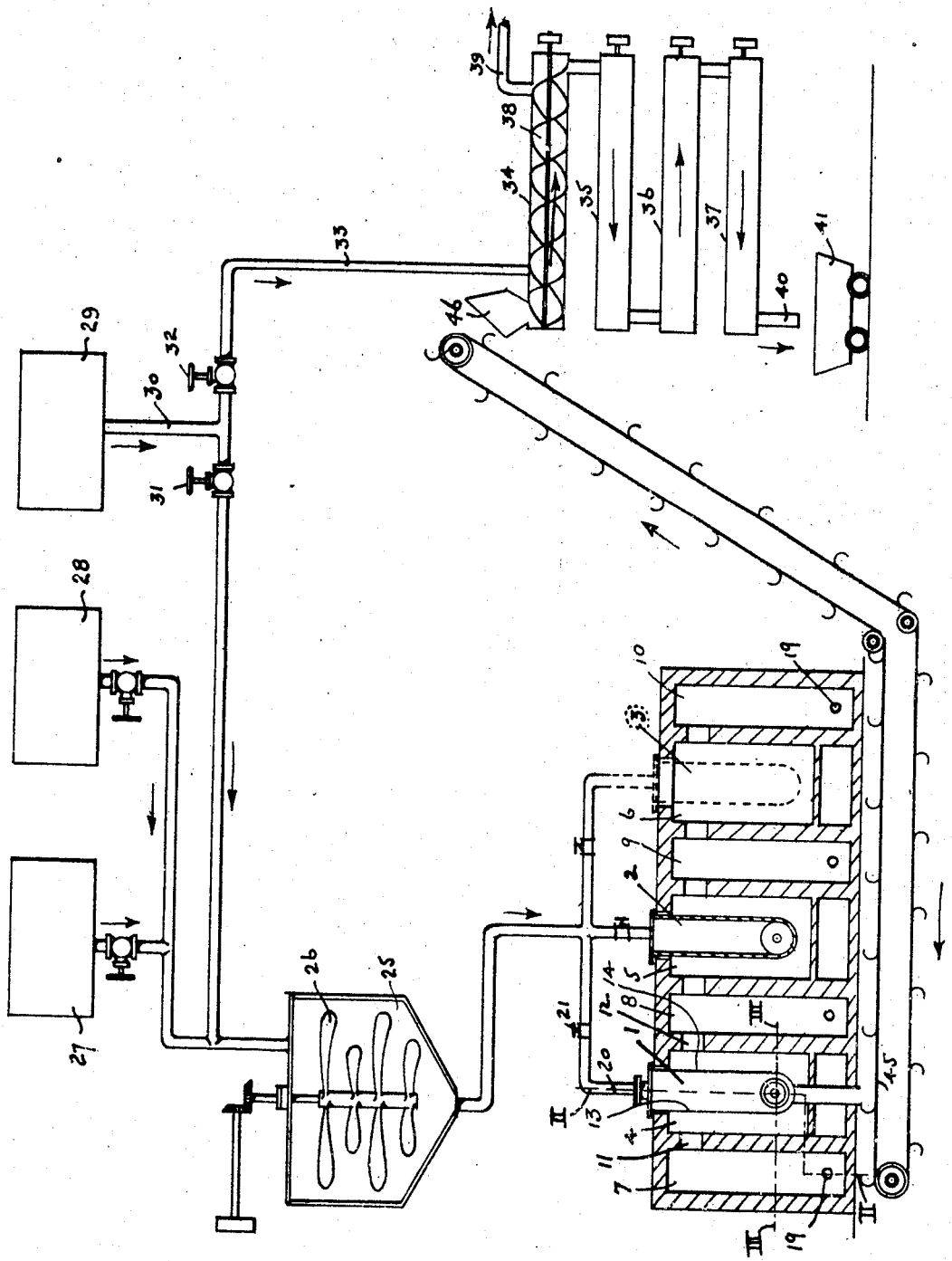
INVENTOR.
Gustav T Reich
BY Miller Henry & Boyken
ATTORNEY.

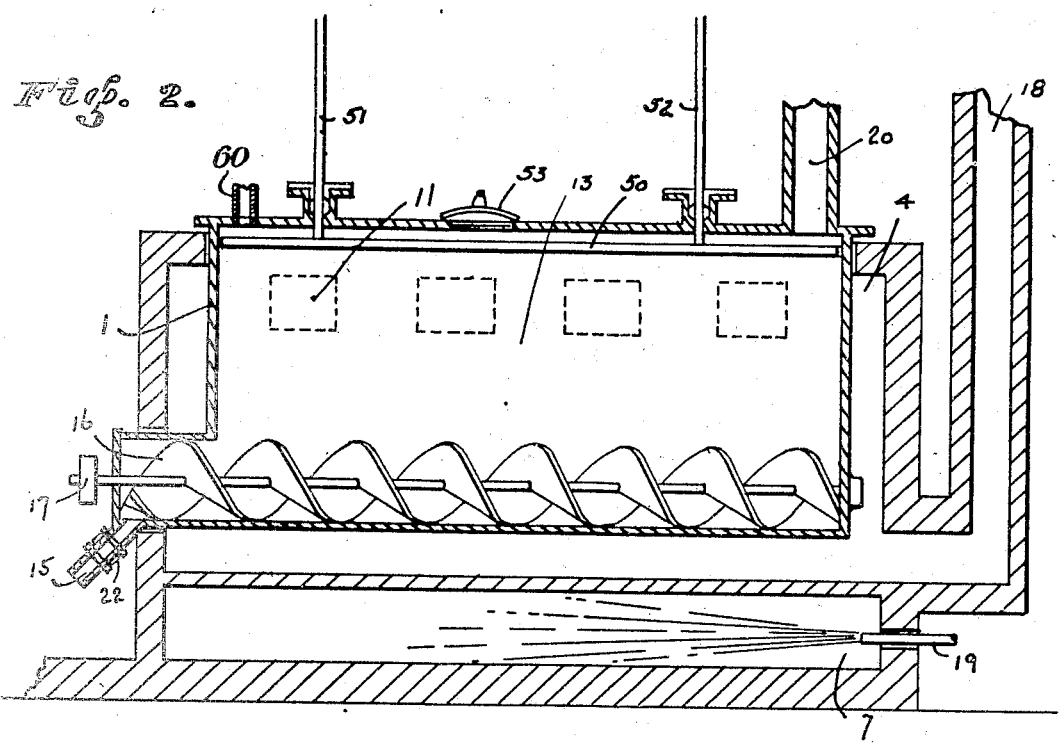
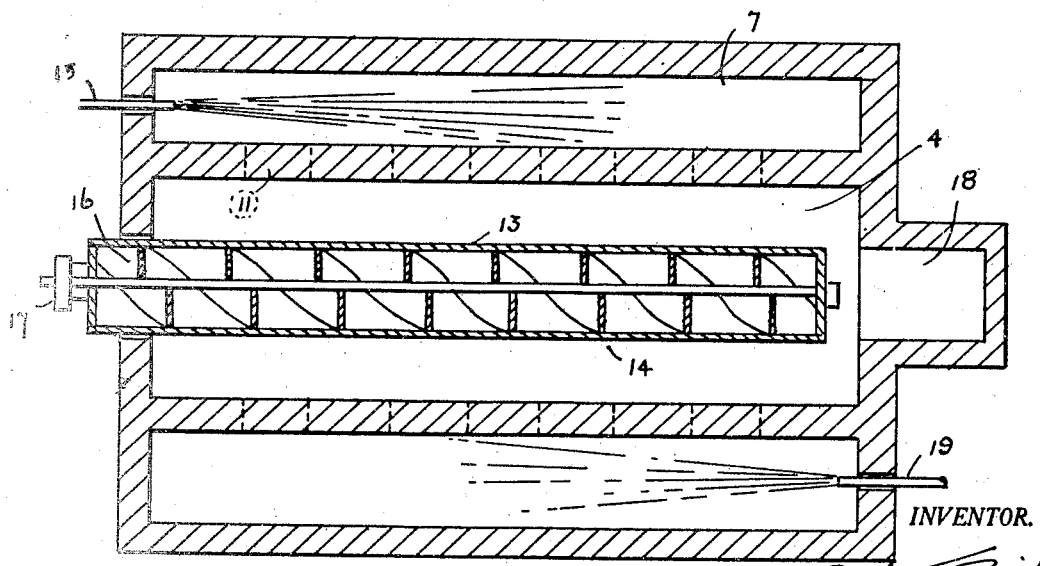

Patented Jan. 8, 1929.

1,698,171

UNITED STATES PATENT OFFICE.

GUSTAVE T. REICH, OF SAUSALITO, CALIFORNIA.

APPARATUS FOR TREATMENT OF WASTE ORGANIC MIXTURES AND THE LIKE.

Application filed April 1, 1924. Serial No. 703,572.

My invention is particularly applicable for the destructive distillation or the dehydration, or both of organic wastes, such as those obtained in the production of ethyl alcohol, for instance distillery slop as obtained by the fermentation of cane molasses, and other organic mixtures containing nitrogen or potash or both.

The object of my invention is the economic recovery of fertilizers and chemical by-products. For that purpose I have invented an apparatus whereby the said organic mixture or slop may be heated in a suitable container under special conditions of temperature equalization throughout the mass.

By referring to the accompanying drawings my invention will be made clear.

Fig. 1 illustrates, somewhat diagrammatically, an apparatus employing my invention.

Fig. 2 is an enlarged section on the line II—II of Fig. 1 and

Fig. 3 is a section taken on the line III—III of Fig. 1.

Throughout the figures the same numerals are used to designate identical parts.

The numeral 1 is one of the retorts shown in end elevation, 2 is a second retort shown in vertical section, and 3 is a third retort.

These retorts are mounted in heating chambers 4, 5, 6, respectively and heated by the gases of combustion passing from the combustion chambers 7, 8, 9, 10, which may communicate with the respective heating chambers by a plurality of passages, as 11, 12. The movement of the combustion gases through the passages 11, 12, may be controlled by any conventional means as dampers, not shown, thereby enabling any retort to be cut out for repairs.

These passages 11, 12 may be positioned in the upper portions of the dividing walls between the heating and combustion chambers and thereby the more intense heat is applied to the upper portions of the side walls of the retorts as indicated at 13, 14, respectively. In this way the contents of each retort may be more intensely heated in its upper strata, thus preventing ebullition thereof.

Flues, not shown, may be employed to secure the equal distribution of the heat longitudinally on the retort walls.

It will be seen that the two side walls of each of the three retorts are thus fully exposed to the more intense heat; all six side walls of the three retorts being heated in the example here shown by the employment of four combustion chambers. And it will now be seen that the number of combustion chambers will with any number of retorts, be equal to the number of retorts plus one.

Each retort may be provided with an outlet spout 15, see Fig. 2, and preferably also with a conveyer 16 operated by conventional means as the pulley 17, whereby the thickened contents of the retort during or after treatment may be mechanically forced from the spout 15 as may be required. Or if desired an entire end of the retort may be made removable and the sides of the retort tapered outwards toward said end thus enabling the entire contents of the retort to be removed "en masse" through said end.

Another preferred construction provides an inner shell removable with the solidified or reduced material through the top of the retort (by removing the cover thereof). In this case it is advisable to make the walls of the retort and of the shell to flare upwardly.

After the abstraction of heat from the gases entering through 11 and 12 they are discharged through the chimney 18. The heating of the gases is accomplished by any suitable means as oil burners 19, 19, in each of the combustion chambers, or if preferred heat may be supplied from a central generating system.

The mixture may be introduced into the retorts as through the inlet pipes 20, and it is to be understood that suitable valves may be introduced as at 21, 22, respectively, or elsewhere in any portion of the inlet pipes 20 and outlet pipes 15 to control the flow of the contents to, or arrest the contents within the retort, as may be desired.

The mixture may be introduced direct to the retorts or from the stirring or agitating chamber 25 wherein the agitator 26 is mechanically operated.

The material or mixture, which it is desired to treat, is introduced into 25 from the compartment 27 with a suitable quantity of ammonium sulphate from the hopper 28. At 29 is shown a container for sulphuric acid which may be fed through the pipe 30 under the control of valve 31 to the mixture during treatment or through the pipe 33 controlled by valve 32 to the hydrochloric acid apparatus indicated by the plurality of treatment chambers, 34, 35, 36, 37, wherein the treated mixture containing the sulphates and chlorides is agitated by any conventional means, as by the screws 38, with the added sulphuric acid from the pipe 33. This results in hydrocholoric acid being released. The now treated residue discharged by the pipe 40 into the car 41 may be employed direct or mixed with any suitable material and/or otherwise packed as finished fertilizer.

During the heat treatment of the concentrated slop in the retorts, frothing is reduced to a minimum by the heat transfer taking place from the upper strata in a downward direction and as the contents become more and more concentrated the diaphragm plate 50 may be manipulated from the outside by rods 51, 52, to compress the contents and insure its complete entrainment by the screw 16.

The retorts are provided preferably with curved or tapering bottoms and smooth interiors to reduce the depositing of carbon thereon and to facilitate cleaning.

While my invention is capable of being carried out in many different ways, I shall describe its application particularly to the treatment of distillery slop as obtained from the fermentation of cane molasses.

Such distillery slop would contain dry approximately 3% of nitrogen and 10% of potash ($K_2O$). The potash content being divided into about 2½% of the $K_2O$ as potassium sulphate, 4% of the $K_2O$ as chloride and 3½% of the $K_2O$ as organate. At 30° Baumé this slop will contain approximately 50% of water and 50% of solids, and 2000 pounds of this mixture will therefore contain 25 pounds of the potash $K_2O$ as potassium sulphate; 40 pounds as potassium chloride and 35 pounds as potassium organate.

This mixture being contained in hopper 27 may be introduced into the mixing chamber 25 together with 125 pounds of ammonium sulphate from hopper 28 or sulphuric acid and correspondingly less ammonium sulphate may be used, depending upon the amount of nitrogen desired in the finished fertilizer, and from the mixing chamber the mixture passes into the retorts 1, 2, 3. The movement of the ingredients and mixture follows the directions indicated by the arrows.

The reaction which takes place, preferably under the influence of heat, will result in 138.75 pounds of potassium sulphate and 45.2 pounds of ammonium chloride. The conversion of potassium chloride into potassium sulphate will take place at a lower temperature than if treated with sulphuric acid only. Owing to the presence of ammonium salt a larger percentage of potassium sulphate can be removed if desired than without same. The mixture from the mixing chamber, which may have been freed by centrifuging of part of its potassium sulphate content, approximately 92.5 pounds passes into the retorts 1, 2, 3, and then heat may be applied from the burners 19, 19, through the passages 11, 12 and against the sides 13, 14, of the several retorts.

The mixture which during the treatment in the retorts may lose 25% of the moisture is discharged through the spouts 15 by the forcing action of the screw conveyer 16 and thence into the conveyer 45, from which it is delivered into the spout 46 for further treatment in the treatment chambers, 34, 35, 36, 37, where by the addition of 78 pounds of sulphuric acid 31 pounds of hydrochloric acid are liberated through the pipe 39, and a mixture containing 92½ pounds of potassium sulphate is discharged through spout 40.

By the described treatment of the mixture potassium sulphate, hydrochloric acid and a residue containing 6% of nitrogen and 6.5% of potash ($K_2O$) suitable for use as fertilizer are produced.

It is to be understood that the retorts may be provided with uptake pipes one of which is shown at 60 through which the evolved gas and vapors pass to gas collecting mains and may be passed through air or water coolers, scrubbers, exhausters, etc., as required in any particular case. Also the retorts may be operated under any desired pressure or vacuum conditions depending largely on the mixture treated and the product or character of product desired.

I claim:

1. Apparatus for the treatment of organic wastes comprising a heating chamber, two combustion chambers on opposite sides of said heating chamber, a retort suspended in said heating chamber and spaced from the bottom thereof and extending through the top thereof and spaced from the walls thereof on opposite sides, passage means through opposite walls of said heating chamber on opposite sides of said retort adjacent the upper portion of said retort, the passage means on each of said sides of said heating chamber communicating said heating chamber with the combustion chamber on the same side of said heating chamber, and a discharge port from said heating chamber remote from said passage means.

2. Apparatus for the treatment of organic wastes as defined in claim 1 in which the dimensions of the combustion chambers and heating chamber are relatively narrow in the direction perpendicular to the sides of the retort adjacent to the combustion chambers, and the retort is relatively deep and trough-shaped.

GUSTAVE T. REICH.